(12) United States Patent
Hahn et al.

(10) Patent No.: US 6,710,306 B2
(45) Date of Patent: Mar. 23, 2004

(54) PROCESS AND DEVICE FOR CERAMISING THE BASE GLASS OF GLASS CERAMICS

(75) Inventors: Gerhard Hahn, Allenfeld (DE); Andreas Langsdorf, Ingelheim (DE); Ulrich Fotheringham, Wiesbaden (DE); Hauke Esemann, Wörrstadt (DE); Bernd Hoppe, Ingelheim (DE); Sybill Nüttgens, Frankfurt am Main (DE)

(73) Assignee: Schott Glas, Mainz (DE)

( * ) Notice: Subject to any disclaimer, the term of this patent is extended or adjusted under 35 U.S.C. 154(b) by 46 days.

(21) Appl. No.: 10/021,981

(22) Filed: Dec. 13, 2001

(65) Prior Publication Data

US 2002/0096649 A1 Jul. 25, 2002

(30) Foreign Application Priority Data

Dec. 14, 2000 (DE) .......................... 100 62 187

(51) Int. Cl.$^7$ .............. F27B 9/06; F27B 9/10; F27B 9/24; C03B 25/00
(52) U.S. Cl. ............ 219/411; 219/388; 219/405; 65/118
(58) Field of Search ............... 219/388, 405, 219/411; 65/111, 114, 117, 118, 119

(56) References Cited

U.S. PATENT DOCUMENTS

| 3,607,198 A | * | 9/1971 | Meunier et al. | 65/114 |
|---|---|---|---|---|
| 3,637,362 A | * | 1/1972 | Oelke et al. | 65/111 |
| 3,840,360 A | * | 10/1974 | Wright et al. | 65/119 |
| 4,921,520 A | * | 5/1990 | Carlomagno | 65/111 |
| 5,290,999 A | * | 3/1994 | Kuster et al. | 219/388 |
| 5,782,947 A | * | 7/1998 | Boaz | 65/111 |
| 6,053,011 A | * | 4/2000 | Lisec | 65/114 |

FOREIGN PATENT DOCUMENTS

| DE | 28 03 455 | 8/1979 |
|---|---|---|
| DE | 299 05 385 | 9/2000 |

* cited by examiner

*Primary Examiner*—Joseph Pelham
(74) *Attorney, Agent, or Firm*—Baker & Daniels

(57) ABSTRACT

The present invention relates to a process for ceramising glass ceramics (so-called green glass).

The process according to the present invention comprises the following procedural steps:
  green glass (3) is manufactured;
  the green glass is placed in a suspended state on a levitation substrate by supply of levitation gas;
  the green glass is heated in the suspended state by IR radiation until such time as the desired ceramising has set in.

20 Claims, 2 Drawing Sheets

PROCESS AND DEVICE FOR CERAMISING THE BASE GLASS OF GLASS CERAMICS

The present invention relates to the field of ceramising the base glass of glass ceramics. The base glass is also called green glass.

It is known to ceramise such base glass in a conventional convection furnace or a radiation furnace. The glass is mostly in pane form and is laid on a carrier plate which may comprise a sintered quartz glass powder or grains, a porous material.

The vitreous material expands in all directions as it is being heated, whereas the carrier plate remains relatively dimensionally stable on account of its minimal expansion coefficient. Relative movement takes place therefore between the base glass and the carrier plate, which may lead to the glass being scratched and thus to a decline in product quality. The majority of the relative movement (cause of scratching) is caused by contraction. Heating the base glass also requires considerable quantities of heat and relatively substantial periods of time.

The object of the present invention is to arrange the ceramising process of the base glass of glass ceramics such that the quantity of energy required for this is clearly reduced, and that superficial defects can be avoided by contact with a carrier plate.

This task is solved by the features itemised in the independent claims. Gas film levitation is thus produced by means of a gas cushion which can build up between the base glass and a supporting substrate. During the overall ceramising period the base glass is kept in suspension so that no imprints or relative movement of the supporting substrate can have a disruptive effect on the green glass. In addition, the glass is prevented from sticking to the substrate.

By using short-wave IR radiation for warming, as described in DE 299 05 385 U1, the time needed for heating and thus also for ceramising is drastically reduced. The consequence of this is that the time needed for levitation is also decreased, as is the energy expenditure required for levitation.

At the same time the gas utilised for levitation can be used to create a defined atmosphere. The levitation gas can also serve to homogenise the temperature.

The process according to the present invention is self-stabilising. It runs very quickly and very homogeneously. The product accordingly becomes a high-value product.

According to another idea of the invention the base glass is first manufactured conventionally, then transferred to a levitation substrate, pre-heated in the levitation substrate, by means of IR radiation, for example, and to a certain temperature below the adhesion temperature of the glass. A thermal shock is then applied to the base glass, also by means of infrared radiation with simultaneous gas supply, such that the base glass is in suspension, and finally relayed to a station for further processing, after the critical adhesion temperature is exceeded and on completion of the desired ceramising, if required.

In this embodiment the base glass is heated in two phases. In the first heating phase the base glass is heated to a temperature below the critical adhesion temperature. In the second warming phase the adhesion temperature is exceeded and reaches the high temperature value for ceramising. The second phase can also take place below the adhesion temperature.

The invention offers the following advantages:
The first heating phase of the green glass poses no technical problems. The type and duration of the first heating phase are inconsiderable and thus unproblematic. No gas levitation is required during the first heating phase.

The second heating phase occurs extremely quickly based on choice of the heating means, namely an IR radiation device. This second heating phase generally requires less than one minute. Correspondingly shorter downtimes on the gas levitation membrane are thus necessary (ceramising at this temperature lasts substantially longer). Possible contacts between green glass and walls of the membrane are so minimal, if at all present, that adhesion does not occur or does but minimally only. Above all, there is no scratching.

The energy required for levitation is adequate due to the minimal period of the second heating phase.

The energy loss as a result of the transfer of heat from the now very hot green glass to the relatively cold environment (membrane) is likewise minimal due to the thermal conduction reduced by the air gap.

Compared to the prior art the green glass is heated exclusively, and not the environment, nor the membrane, resulting in further economising on energy compared to conventional processes and devices.

Both elements according to the present invention—levitation on the one hand and application of IR radiation on the other—are decidedly important in their combination. If heating is undertaken with conventional heating only on a normal substrate (without levitation), the problem of adhesion would arise, since in this case the substrate increases the temperature of the glass to be warmed by thermal conduction and thermal transfer.

The gas utilised for levitation can be used at the same time to create a defined atmosphere and also for homogenising the temperature (cf. high-convection furnace). Porous materials or perforated plates are used as a membrane, through which the gas is supplied. At the same time it must first be ensured that there is adequate gas permeability, and secondly the membrane must adequately reflect IR radiation. An example of a suitable material for such a combination is a porous alumosilicate foam. The material has adequate gas permeability, so that a glass or glass ceramic plate can be suspended, and has sufficiently high reflectivity for IR radiation. A perforated plate, made of alumosilicate for example, can also be used.

According to an advantageous embodiment the levitation substrate comprises a membrane material, composed of porous materials from $Al_2O_3$, $BaF_2$, $BaTiO_3$, $CaF_2$, $CaTiO_3$, $MgO$, $3.5Al_2O_3$, $SrF_2$, $SiO_2$, $SrTiO_3$, $TiO_2$, spinel, cordierite, cordierite sintered glass ceramics.

The invention is now explained with reference to the diagrams which illustrate three decisive phases of the heating process according to the present invention.

Figure 3:
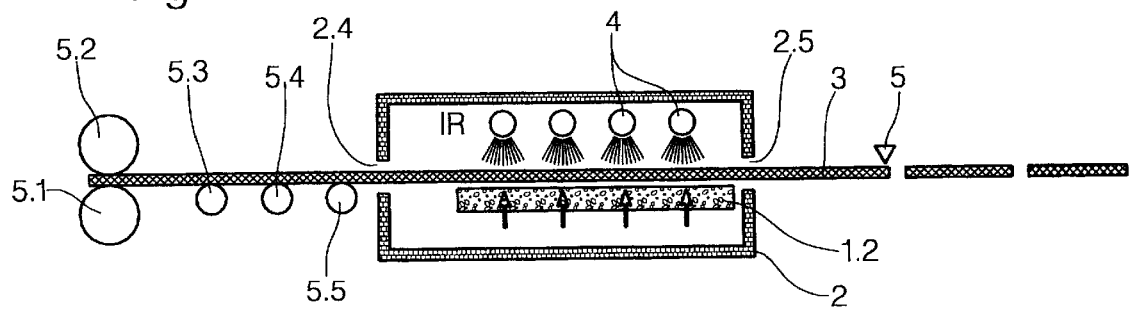

FIG. 3 diagrammatically illustrates a ceramising plant in side elevation.

Figure 4:
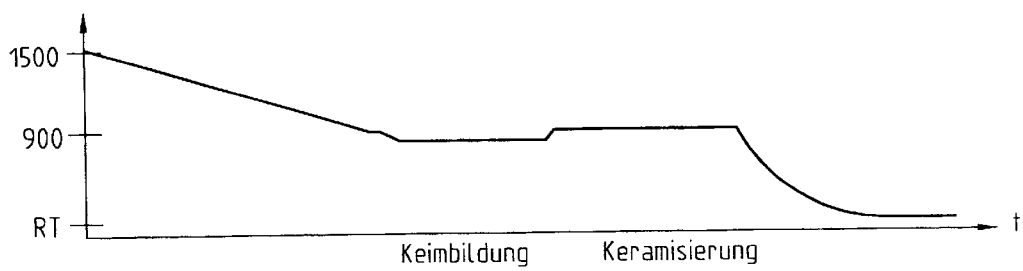

FIG. 4 illustrates the temperature cycle of the ceramising process.

Figure 5:
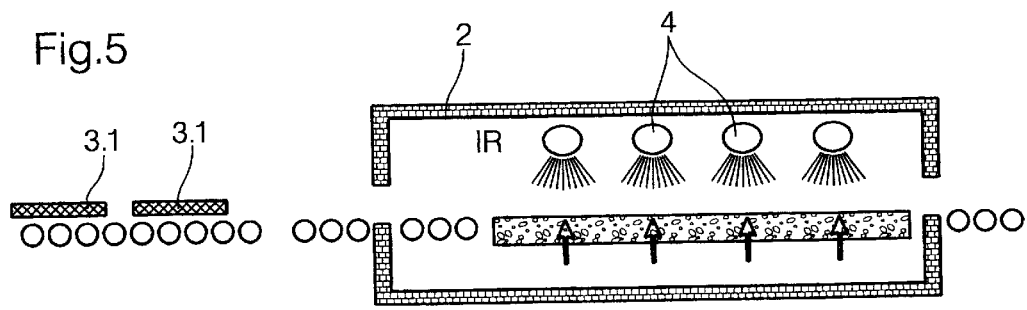

FIG. 5 illustrates another ceramising plant.

Figure 6:
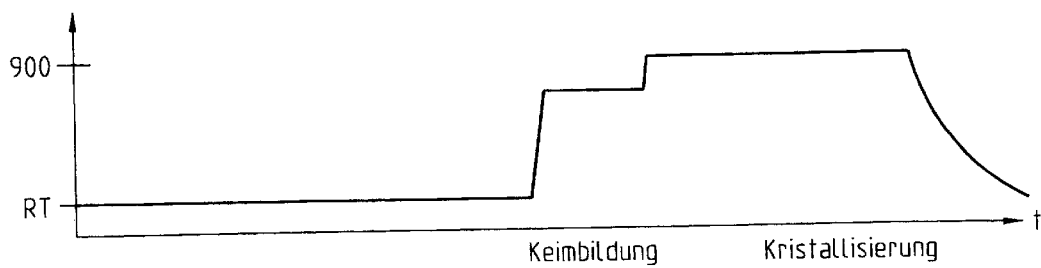

FIG. 6 illustrates the associated temperature cycle of the ceramising process.

Figure 1:
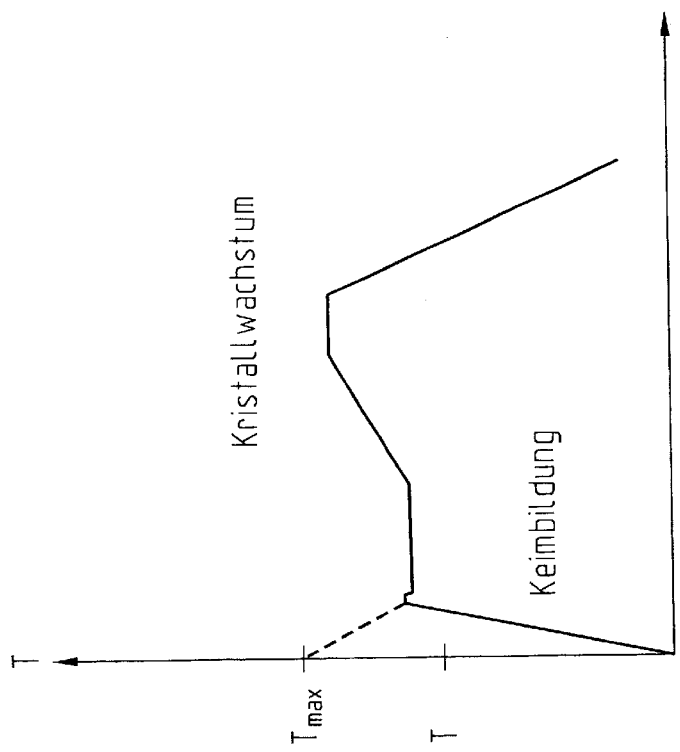
FIG. 1 illustrates an embodiment for ceramising level bodies.

FIG. 1 shows a carrier plate 1 as levitation substrate. The carrier plate 1 bears a membrane 1.2 made of porous material. The carrier plate 1 and membrane 1.2 are located in a housing 2 having an air inlet 2.1 and an air outlet 2.2. The carrier plate 1 exhibits a gas connection 1.1. A base glass 3 in the form of a glass pane is positioned above the membrane 1.2.

The housing 2 encloses walls 2.3 which have strongly IR-reflecting properties. The device includes an array of IR rays, not illustrated here.

A gas, which enters through the open pores of the membrane 1.2, is introduced via the gas connection 1.1. An air cushion forms between the upper surface of membrane 1.2 and the lower surface of the preform 3. The preform hovers on this air cushion until such time as ceramising is completed.

The device is suited both to batch operation, and to continuous operation. The housing 2 can also be designed as an elongated chamber, with an inlet on one front side and an outlet on the other front side. Both front sides are fitted with inlet slots which correspond in configuration and form to the preform.

The glass pane 3 does not have to be absolutely flat. It may also exhibit a trough or shell shape, as indicated by dashed lines; see the glass pane 3.1. In such a case the upper surface of the membrane 1.2 has a geometrically similar contour. In this case also both batch and continuous operation are possible.

Figure 2:
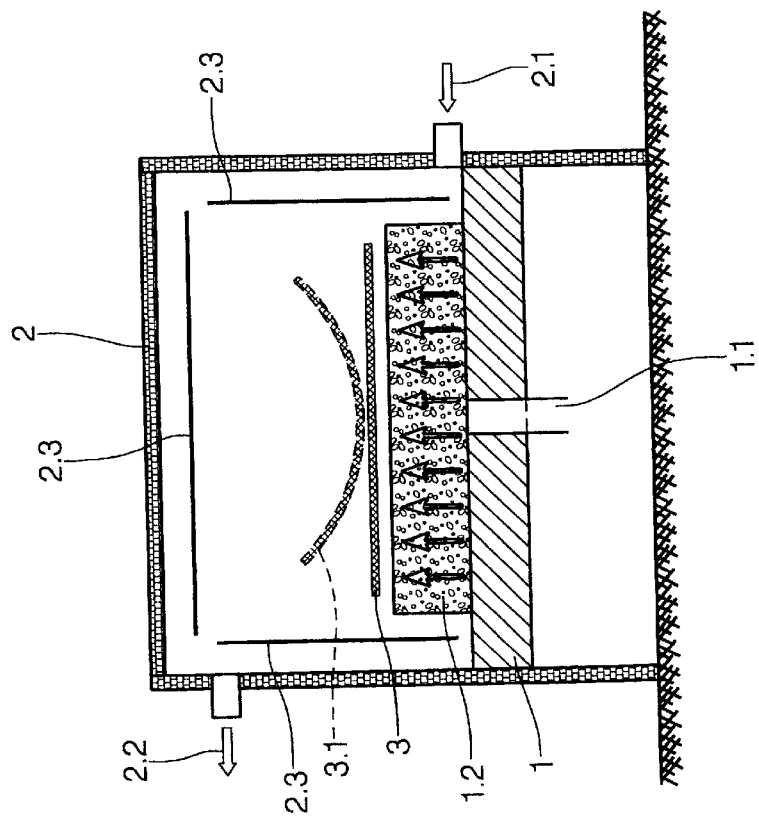
FIG. 2 illustrates the temperature cycle over time.

FIG. 2 illustrates the temperature cycle of the glass over time. Here, the dashed line shows the temperature cycle in the case of a molten mass.

Inert gas, which behaves unobtrusively relative to the material of the glass and relative to the material of the levitation membrane, is considered as a levitation gas.

The plant illustrated in FIG. 3 serves to ceramise a glass band 3 after profiling via rolling, floating, drawing or the like.

The most important elements are again a porous membrane 1.2, a plurality of IR rays 4 and a housing 2. The housing has an inlet slot 2.4 and an outlet slot 2.5 for entry or exit of the glass band.

As is evident, a conveyor path is interposed upstream of the actual ceramising zone, comprising two draw-in rollers 5.1, 5.2 as well as a number of guide rollers 5.3, 5.4, 5.5.

A separating device 5, which separates the glass band 3 into individual sections, is located in the direction of feed behind the ceramising zone.

FIG. 4 illustrates the temperature cycle of the process of nucleation with subsequent ceramising, such that the temperature is applied to the ordinates and the distances are applied to the abscissas.

The plant according to FIG. 3 is characterised by the following advantages:

The moulding heat still contained in the glass band is utilised such as to optimise energy efficiency. In addition, the plant can operate by a continuous process, in which a continuous glass band rather than individual plates is ceramised. No material damage occurs when the glass material shrinks in the vicinity of the guide rollers.

Compared to the embodiment illustrated in FIGS. 3 and 4 the subject of the plant according to FIG. 5 is individual plates 3.1 running through the ceramising zone. Due to the use of IR radiation by the IR radiator 4 heating to nucleation temperature happens very quickly and generally lasts approximately one minute only. Volume heating takes place, enabling a brief ceramising period, because good homogeneity can be attained by means of a chamber repeatedly reflecting the radiation.

The invention generally concerns the treatment of flat materials, and certainly both flat and curved two-dimensional bodies, such as shell-shaped bodies, though this is not absolutely necessary. Different shaped bodies can also have access to treatment by the process according to the present invention or by the device according to the present invention.

What is claimed is:

1. A process for ceramising green glass, comprising the steps of:

providing a portion of green glass;

levitating the glass portion above a levitation substrate comprising one of a porous material and a perforated plate by supplying gas through the levitation substrate, the levitation substrate reflective of infrared radiation; and subjecting the levitated glass portion to infrared radiation until such time as the desired ceramising has set in.

2. The process of claim 1, further comprising, prior to said subjecting step, the additional step of pre-heating the portion of green glass to a temperature below an adhesion temperature of the portion of green glass.

3. The process of claim 1, wherein the portion of green glass is a separate piece of green glass.

4. The process of claim 1, wherein the portion of green glass is a glass band.

5. A device for ceramising green glass, comprising;

a levitation substrate comprising one of a porous material and a perforated plate, said levitation substrate reflective of infrared radiation;

a gas source supplying gas through said levitation substrate; and an infrared radiator emitting infrared radiation, whereby green glass may be levitated above said levitation substrate by said gas and subjected to infrared radiation from said infrared radiator.

6. The device of claim 5, further comprising a heater for heating green glass to below the adhesion temperature of the green glass, said heater disposed upstream of said infrared radiator, whereby the green glass is heated by said heater prior to being supported above said levitation substrate by said gas and subjected to infrared radiation from said infrared radiator.

7. The device of claim 5, wherein said infrared radiator comprises a radiation chamber having a plurality of walls, said walls having an infrared reflectivity of greater than 80%, and said radiator emits short-wave halogen IR rays having a color temperature of between 2000 k and 3000 k.

8. The device of claim 7, wherein said levitation substrate has an infrared reflectivity of greater than 80%.

9. The device of claim 5, further comprising an elongated chamber housing said levitation substrate, said infrared radiator, and the green glass, said elongated chamber having an inlet side and an outlet side.

10. The device of claim 5, wherein said levitation substrate comprises a porous membrane of one or more of the group consisting of $Al_2O_3$, $BaF_2$, $BaTiO_3$, $CaF_2$, $CaTiO_3$, $MgO$, $3.5Al_2O_3$, $SrF_2$, $SiO_2$, $SrTiO_3$, $TiO_2$, spinel, cordierite, and cordierite sintered glass ceramics.

11. The device of claim 5, wherein said levitation substrate comprises a perforated plate having an infrared-reflective coating.

12. The process of claim 2, wherein the portion of green glass is a separate piece of green glass.

13. The device of claim 6, wherein said infrared radiator comprises a radiation chamber having a plurality of walls, said walls having an infrared reflectivity of greater than 80%, and said radiator emits short-wave halogen IR rays having a color temperature of between 2000 k and 3000 k.

14. The device of claim 6, further comprising an elongated chamber housing said levitation substrate, said infrared radiator, and the green glass, said elongated chamber having an inlet side and an outlet side.

15. The device of claim 7, further comprising an elongated chamber housing said levitation substrate, said infrared radiator, and the green glass, said elongated chamber having an inlet side and an outlet side.

16. The device of claim 8, further comprising an elongated chamber housing said levitation substrate, said infrared radiator, and the green glass, said elongated chamber having an inlet side and an outlet side.

17. The device of claim 6, wherein said levitation substrate comprises a porous membrane of one or more of the group consisting of $Al_2O_3$, $BaF_2$, $BaTiO_3$, $CaF_2$, $CaTiO_3$, MgO, $3.5Al_2O_3$, $SrF_2$, $SiO_2$, $SrTiO_3$, $TiO_2$, spinel, cordierite, and cordierite sintered glass ceramics.

18. The device of claim 7, wherein said levitation substrate comprises a porous membrane of one or more of the group consisting of $Al_2O_3$, $BaF_2$, $BaTiO_3$, $CaF_2$, $CaTiO_3$, MgO, $3.5Al_2O_3$, $SrF_2$, $SiO_2$, $SrTiO_3$, $TiO_2$, spinel, cordierite, and cordierite sintered glass ceramics.

19. The device of claim 8, wherein said levitation substrate comprises a porous membrane of one or more of the group consisting of $Al_2O_3$, $BaF_2$, $BaTiO_3$, $CaF_2$, $CaTiO_3$, MgO, $3.5Al_2O_3$, $SrF_2$, $SiO_2$, $SrTiO_3$, $TiO_2$, spinel, cordierite, and cordierite sintered glass ceramics.

20. The device of claim 9, wherein said levitation substrate comprises a porous membrane of one or more of the group consisting of $Al_2O_3$, $BaF_2$, $BaTiO_3$, $CaF_2$, $CaTiO_3$, MgO, $3.5Al_2O_3$, $SrF_2$, $SiO_2$, $SrTiO_3$, $TiO_2$, spinel, cordierite, and cordierite sintered glass ceramics.

\* \* \* \* \*